United States Patent [19]

Landis

[11] 4,321,047
[45] Mar. 23, 1982

[54] SIMULATOR AND PROCESS FOR TEACHING SURGICAL KNOT TYING TECHNIQUES

[76] Inventor: Bradley Landis, 704 Westholme Ave., Los Angeles, Calif. 90024

[21] Appl. No.: 156,839

[22] Filed: Jun. 5, 1980

[51] Int. Cl.³ ............................................. G09B 23/28
[52] U.S. Cl. .................................. 434/262; 73/862.48
[58] Field of Search ............................... 434/162, 172; 73/862.48, 862.64; 272/68

[56] References Cited

U.S. PATENT DOCUMENTS

| 770336 | 9/1904 | Terry | 272/68 |
|---|---|---|---|
| 3,132,861 | 5/1964 | Horney | 272/68 |
| 3,763,701 | 10/1973 | Wright | 73/862.48 |
| 3,775,865 | 12/1973 | Rowan | 434/262 |

FOREIGN PATENT DOCUMENTS 550961  2/1943  United Kingdom ................. 272/68

Primary Examiner—Harland S. Skogquist
Attorney, Agent, or Firm—Warren T. Jessup

[57] ABSTRACT

A simulator for and a process of teaching surgical knot tying techniques. A flexible tube made of material which simulates various human vessels and ducts is positioned between the arms of a support frame. Inside the tube are spring wires, which are strung under tension between the arms of the support frame. A detecting device is connected to the wires, which will generate various kinds of signals when the wires make contact with one another. The student loops a piece of surgical thread around the tube and tightens the loop until wires touch, thus indicating that a certain force has been applied to the tube by the loop.

10 Claims, 4 Drawing Figures

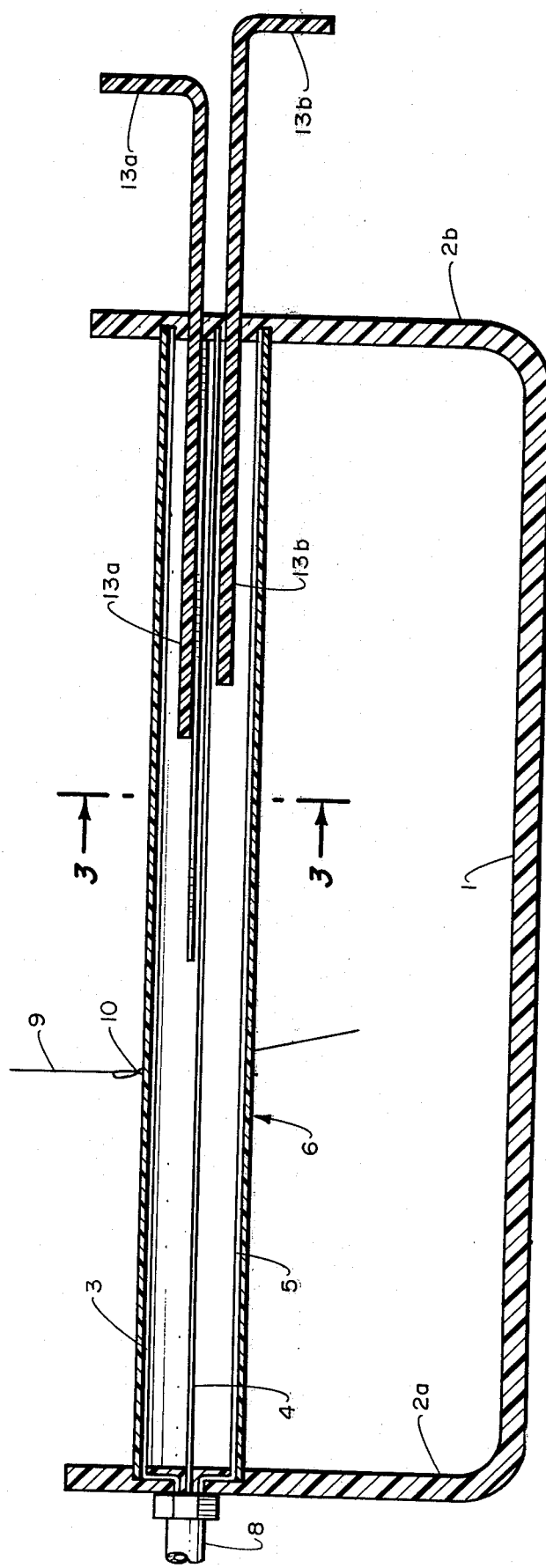
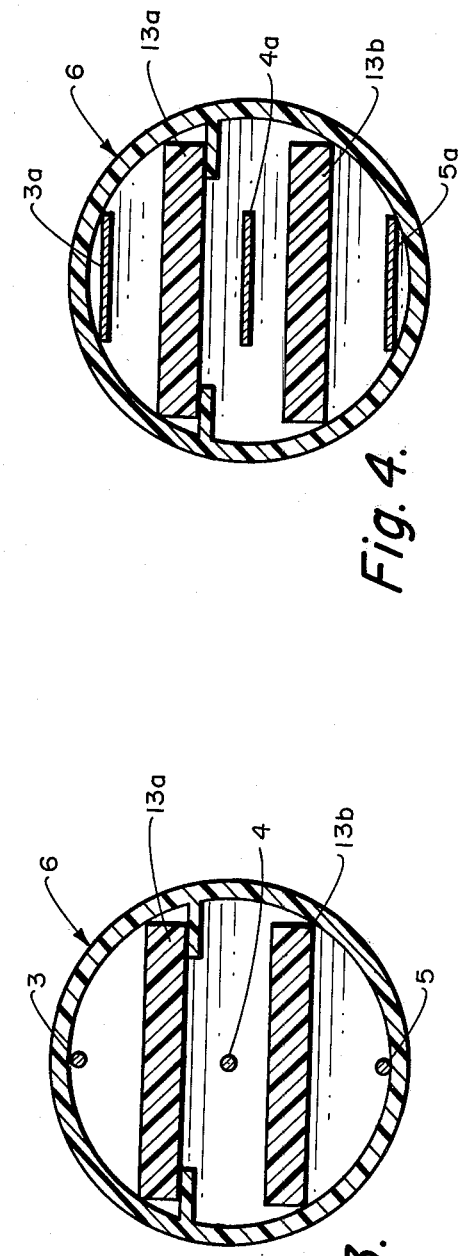
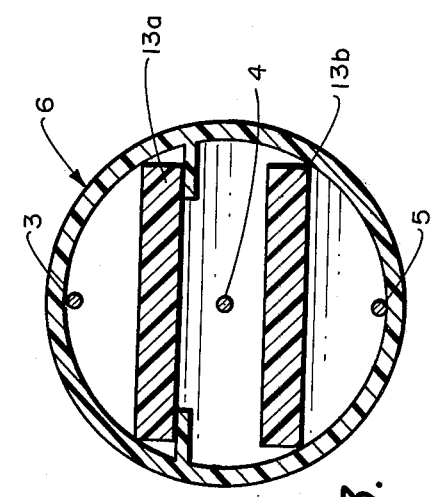

SIMULATOR AND PROCESS FOR TEACHING SURGICAL KNOT TYING TECHNIQUES

SUMMARY OF THE INVENTION

The simulator includes a plurality of parallel spring wires fixedly mounted between the arms of a support frame and uniformly spaced apart in a vertical array. A flexible tube envelopes the wires. A top wire runs along the top inside wall of the tube; an axial or center wire runs along the axis of the tube; and a bottom wire runs along the bottom inside wall of the tube. A detecting means is connected to the wires such that distinctive signals will be generated when the wires are caused to make contact with one another. By using known surgical procedures and tools, a piece of thread is looped around said tube and a surgical knot is loosely tied with the thread.

The simulator simulates human vessels and ducts. The student practices upon the simulator to learn to apply the correct amount of upward and downward pull when tying off the simulated duct with the surgical knot. When the loosely tied knot is constricted, the flexible tube is compressed, causing the spring wires to move toward one another. When contact is made, a signal is generated in the detecting means, thereby telling the student that a given amount of pull was exerted up, or down, or both, when tying the knot. Two longitudinally movable spacers are inserted in one end of the tube, one above and one below the center wire. They may be pushed into the tube varying distances to alter the tube's compressibility. By inserting the spacers to a particular point within the tube, the simulator will simulate a given biological vessel or duct.

Accordingly, it is an object of this invention to provide a simulator for teaching surgical knot tying techniques without the necessity of actually performing such procedure on a live subject.

It is a further object to teach the method of learning the proper technique of surgical knot tying.

Other objects and advantages of this invention will become apparent from the following portion of the specification, the claims, and the attached drawings.

BRIEF DESCRIPTION OF THE DRAWINGS

FIG. 2 is a cross-sectional view along the line 2—2 of FIG. 1.

FIG. 3 is a cross-sectional view along the line 3—3 of FIG. 2.

FIG. 4 is a cross-sectional view showing a modification of the invention.

DETAILED DESCRIPTION OF THE PREFERRED EMBDDIMENT

Figure 1:
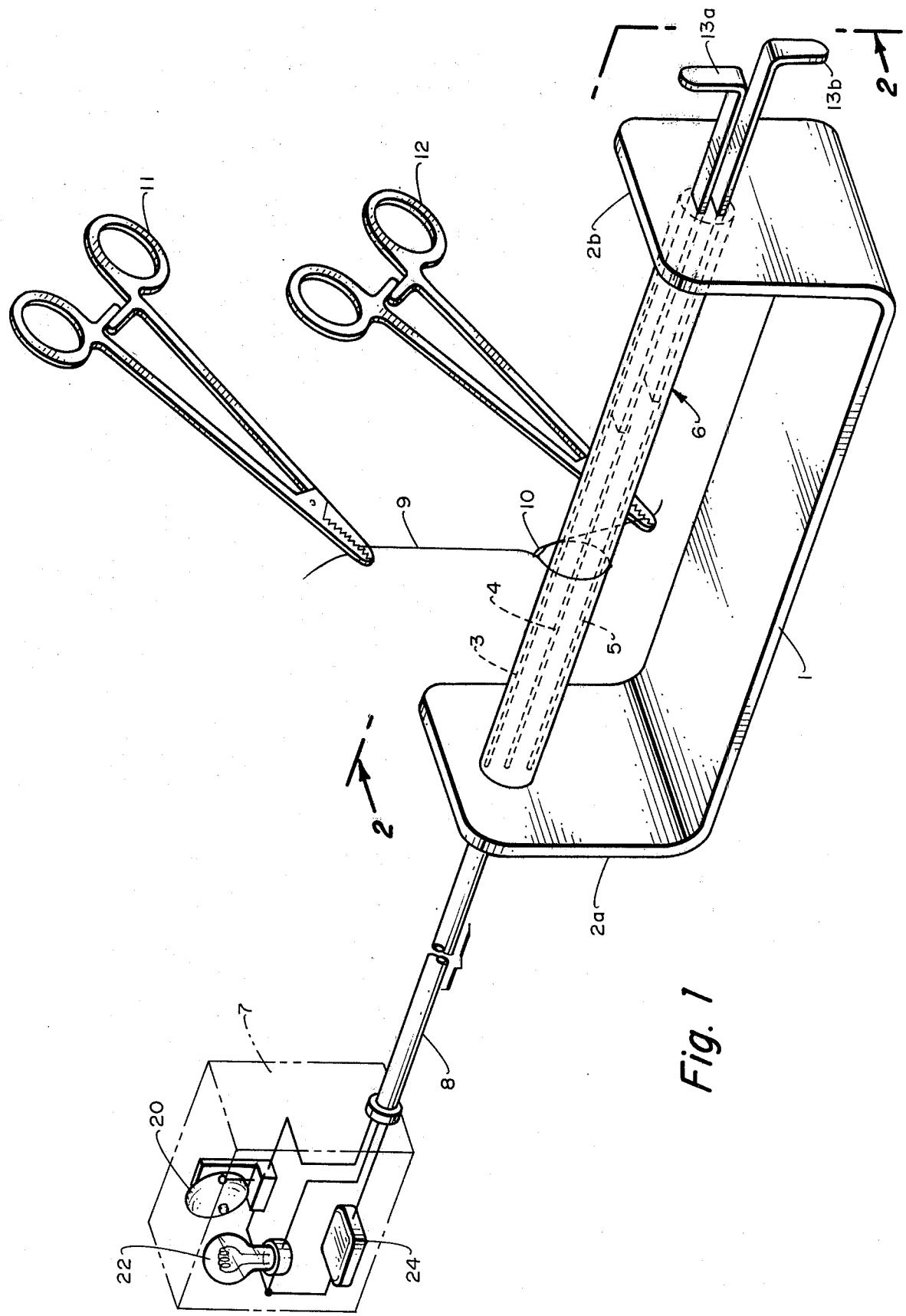
FIG. 1 shows a perspective view of the present invention.

Referring now to FIG. 1, the support frame 1 has a pair of upright arms 2a and 2b. A flexible tube 6 is positioned between the arms 2a and 2b. The flexible, preferably non-conductive, tube may be made of any suitable flexible pliant or resilient material, such as neoprene, rubber, latex, polyurethane, or the like. A satisfactory size may be approximately six inches in length and a half-inch in diameter, but can be of any dimension desired. A plurality of conductors are spaced diametrically within the tube 6, as follows. A top spring wire 3 is strung under moderate tension between the arms 2a and 2b. Top wire 3 runs along the top inside wall of tube 6. An axial or center wire 4 is strung substantially along the axis of tube 6, and a lower spring wire is strung along the bottom inside wall of tube 6. Wires 3, 4 and 5 may be made of any suitable electrically conductive material. A detecting means 7 is connected by wire means 8 to spring wires 3, 4 and 5 and will generate particular kinds of signals when wires 3 and 4 make contact, when wires 4, 5 make contact, or when all three wires 3, 4 and 5 are caused to make contact. FIG. 3 shows in more detail the preferred arrangement of wires 3, 4 and 5. FIG. 2 shows a side view of the invention.

During the simulation of surgical knot tying, tube 6 simulates a biological vessel or duct. The student loops a piece of surgical thread 9 around the circumference of tube 6. A knot 10 is loosely tied with thread 9 using known surgical techniques and tools. The student constricts tube 6 by pulling on the ends of thread 9 with clamping scissors 11 and 12. A downward pull with scissors 12 will cause the upper portion of tube 6 to be squeezed down, causing top wire 3 to be deflected towards axial wire 4. If sufficient pull has been exerted by scissors 12 on thread 9, wires 3 and 4 will make contact and cause a signal to be generated in the detecting means 7. Similarly, an upward pull on thread 9, using scissors 11, will cause the lower portion of tube 6 to be squeezed upward and deflect lower wire 5 towards axial wire 4. The wires 4 and 5 will make contact after enough pull has been exerted with scissors 11 or thread 9, causing another signal to be generated in the detecting means 7. If the tube 6 is tied off too tightly with thread 9, all three wires 3, 4 and 5 may make contact and cause dual signals to be generated in the detecting means 7.

A pair of longitudinally movable spacers 13a and 13b can be inserted into one end of tube 6. These spacers may be made of any type of rigid non-conductive material. Spacers 13a and 13b can be moved independently of or in unison with each other within tube 6. By using the spacers, the student can be trained to deliberately distinguish the up and down pull required when tying off tube 6. Thus, by use of said spacers, tube 6 can be made to simulate a variety of biological ducts and vessels, because, by sliding said spacer further into tube 6, it will increase the tube's resistance to being squeezed inward.

Tube 6 may be calibrated, and by means of a chart, could show the student where to place spacers 13 to simulate a particular biological vessel or duct. The student thereby masters his surgical knot tying techniques without actually performing such operation on a live body.

The detecting means 7 may be a simple audio/visual indicator such as a bell or buzzer 20 connected between wires 3 and 4, and a light 22 between wires 4 and 5. A source of voltage 24, AC or DC, supplies energy for both circuits. Thus, contact between 3 and 4 rings bell 20; contact between 4 and 5 lights bulb 22; and a three-way contact energizes both of the indicators 20 and 22.

A second form of the invention is shown in FIG. 4 wherein the wires in the tube 6 are in the form of flat conductors 3a, 4a and 5a.

Although the device which has just been described appears to afford the greatest advantages for implementing the invention, it will be understood that various modifications may be made thereto without going beyond the scope of the invention, it being possible to replace certain elements by other elements capable of fulfilling the same technical functions therein.

What is claimed is:

1. Simulator for teaching surgical knot tying techniques comprising:
   flexible tube means adapted to be encircled by a tightenable surgical loop;
   a plurality of conductive means within said tube means;
   signal means for indicating when manipulation of the loop has caused at least two of said conductive means to come into contact.

2. Simulator as set forth in claim 1 including longitudinally movable spacer means between said two conductive means for adjusting the magnitude of the force applied by the loop which causes said conductive means to contact.

3. A simulator as set forth in claim 2 including adjusting means for adjusting the magnitude of the force applied by the loop to the tube means which causes said two wires to contact, wherein said adjusting means comprises longitudinally adjustable spacer means between said two wires.

4. Simulator as set forth in claim 1, wherein said flexible tube means is made of material selected from the group of neoprene, rubber, latex, and polyurethane plastic.

5. Simulator for teaching surgical knot tying techniques comprising:
   flexible tube means adapted to be encircled by a surgical loop;
   a plurality of spaced parallel conductors within said tube means;
   signal means connected to said conductors for indicating when said conductors are brought into contact by tightening of the loop.

6. Simulator as defined in claim 5 wherein said adjusting means is a plurality of longitudinally movable spacers.

7. A simulator for teaching surgical knot tying techniques which comprises:
   frame means;
   a plurality of substantially parallel wires mounted to said frame means;
   flexible tube means enveloping said wires adapted to be encircled by a tightenable surgical loop;
   detecting means connected to said plurality of wires for generating a signal when two of said wires make contact with one another as the loop is manipulated.

8. A simulator as defined in claim 7, wherein said plurality of wires includes:
   a top spring wire fixedly mounted under tension to said frame means, running along the top inside wall of said tube means;
   an axial spring wire fixedly mounted under tension to said frame means, running substantially along the axis of said tube;
   a bottom spring wire fixedly mounted under tension to said frame means, running along the bottom inside wall of said tube.

9. Simulator as set forth in claim 8, further comprising:
   adjusting means in said tube means to alter the compressibility of said tube means.

10. Process of teaching surgical knot tying techniques which comprise:
   (a) forming a loop of surgical thread around a flexible tube having diametrically spaced conductors therein;
   (b) loosely forming a surgical knot with the thread;
   (c) pulling on the thread until two conductors are brought into contact with each other, generating a signal indicative of the contacting of the conductors;
   (d) pulling downwardly on the other end of said thread until a signal is generated in said detecting means;
   (e) inserting a tension adjusting means in one end of said tube;
   repeating steps a through d above.

* * * * *